United States Patent [19]
Bauer et al.

[11] Patent Number: 5,687,079
[45] Date of Patent: Nov. 11, 1997

[54] METHOD AND APPARATUS FOR IMPROVED CONTROL OF COMPUTER COOLING FAN SPEED

[75] Inventors: Robert M. Bauer, Shirley; Thomas P. Webber, Cambridge, both of Mass.

[73] Assignee: Sun Microsystems, Inc., Mountainview, Calif.

[21] Appl. No.: 457,555

[22] Filed: Jun. 1, 1995

Related U.S. Application Data

[62] Division of Ser. No. 225,028, Apr. 8, 1994, abandoned.
[51] Int. Cl.$^6$ .................................................. H05K 7/20
[52] U.S. Cl. ............................................ 364/175; 361/695
[58] Field of Search .............................. 361/687, 688, 361/695; 364/130, 141, 175

[56] References Cited

U.S. PATENT DOCUMENTS 5,249,741 10/1993 Bistline et al. .................. 236/49.3
5,287,244 2/1994 Hileman et al. .................. 361/687

OTHER PUBLICATIONS

"Variable Air Cooling for Computer and/or Electronic Equipment", IBM Technical Disclosure Bulletin, vol. 32, No. 10A, Mar. 1990.

–A Declaration of Robert M. Bauer Pursuant To 37 Cfr 1.56 And 1.97, dated Jul. 24, 1995 describing certain technology related to the present invention.

*Primary Examiner*—Jack B. Harvey
*Assistant Examiner*—Jigar Pancholi
*Attorney, Agent, or Firm*—Edward W. Porter

[57] ABSTRACT

A computer has an AC power outlet, preferably a standard AC outlet, into which periperhal devices, such as video monitors, can be plugged. It can turn this outlet on and off under program control, preferably by writing an outlet control signal to an I/O port which controls the outlet. A activity monitor, preferably in software, generates outlet control signals when one or more of the computer's peripheral devices have been inactive for more than a predetermined time. In some embodiments, the activity monitor turn off different parts of the computer in response to different types of inactivity. Preferably the computer can turn off the AC outlet without turning off the computer as a whole, and preferably it turns off the AC power outlet when the computer is turned off. Normally the AC outlet and its switching circuitry are part of the computer's power supply. The invention also includes a computer which has one or more electrically powered fans and an I/O port to which its can write to produce different fan speed control signals. A control device varies the fan's speed in response to the different control signals generated by the port. In one embodiment, the computer stores a value in non-volatile memory, such as in a register on its CPU, indicating which fans speed control signal should be generated when the computer is turned on. Preferably the fan-speed-control device also includes a device for measuring air temperature and for controlling fan speed as a function of that temperature, as well as of the fan speed control signal. In some embodiments two fans are so controlled, with the fans being operated at different speeds to prevent audible beating between them.

15 Claims, 7 Drawing Sheets

METHOD AND APPARATUS FOR IMPROVED CONTROL OF COMPUTER COOLING FAN SPEED

This application is a division of application Ser. No. 08/225,028, filed Apr. 8, 1994, now abandoned.

FIELD OF THE INVENTION

The invention relates to apparatus and methods for saving power in computing machinery.

BACKGROUND OF THE INVENTION

Power management has recently become an important feature in the design of computers such as personal computers and workstations. It has become important because as more people use portable computers, there has become an large demand for such computers run for as long as possible on a given battery charge. Power management has also become important in the arena of desktop computers, because as such computers have become increasingly common in the home and workplace, the amount of power they consume represents an increasingly significant percent of the electric power consumption of many business and households. This is particularly true because many people leave their computers on all the including all night. They do this so their computers will be quickly available for use when desired, and to save the increasingly complex computing environment of programs, documents, and windows which many users like have available on their machines. Thus, it is important, when possible, to reduce the consumption of power by computers.

One common way of saving power in the prior art is the use of an "activity monitor" program. This program is normally an extension of the computer's operating system. During periods of use, the activity monitor senses activity on the computers input devices, such as its keyboard or mouse, assumes the computers is in use, and maintains the cathode ray tube (CRT) monitor and/or other power consuming devices in their normal powered state. If the activity monitor program senses a lack of activity on the input devices for a certain period of time, it assumes the computer is not in use and seeks to reduce power consumption by either shutting off or reducing power to the computer's video display or to other devices. Another reason for using such activity monitors with CRT displays is to decrease the burn out of the phosphors on the screen of such CRT displays which results when portions of the screen stay illuminated for long periods of time.

Most prior aft systems which use activity monitor programs to turn on and off their CRT screens initiate one of two different courses of action when they detected their computer is not in use. If they are designed to work with a special CRT monitor which can have its electron beam shut off, they turn that electron beam off, thereby blanking the display screen of the monitor and saving considerable power. In the more common case in which the activity monitor is designed to work with standard CRT or other displays, they cause a predetermined display to appear on the screen. Usually this predetermined display constantly changes to prevent phosphor burn out, and it includes a lot of dark area, to also help prevent phosphor burn out and to decrease power usage. In either case, however, electrical power continues to be provided to the display. When the activity monitor program senses that activity on the keyboard or mouse has resumed, the normal display capability of the display is restored.

Both types of prior art activity monitor programs have the disadvantage of wasting energy during periods of inactivity. Mores specifically, electrical power to the CRT display monitor is maintained when the computer is not in use. This needlessly consumes power, creating heat in the work place, raises electric utility bills, and adds wear to the CRT monitor.

In addition to monitors, there are often other peripherals which are used with computers which also consume power needlessly when they are left on for long periods of time in which the computer is not in use. Most prior art activity monitors do not address this problem.

Another source of power consumption on computers large enough to have them are the cooling fans which are used to prevent such systems from overheating. Most desktop computers, for example, currently use such fans. Not only does the operation of such fans draw power, but they also create unwanted noise. For these reasons it is desirable to have the fans on such computers operate at fan speeds that provides as much ventilation as is necessary for the proper operation and care of the computers, but not at ones which are higher than necessary for such purposes. In the prior art, the fans provided in the power supplies of some computers have had their fan speed controlled as a function of ambient temperature. This tends to reduce fan speed to a speed which is appropriate, given the ambient air temperature. However, it is often desirable to use the same power supply, or same basic computer with different CPU's or different boards which might greatly change ventilation requirements, and such prior art fan speed control circuits do not address this problem.

SUMMARY OF THE INVENTION

The present invention provides methods and apparatus for saving power in computing systems.

One aspect of the invention saves power by enabling the computer system to turn off one or more peripheral devices which are plugged into it. The computer has an AC power outlet which it can automatically turn on and off, preferably by writing under program control to an I/O port which controls that outlet. The computer includes an activity monitor for monitoring the activity of one or more peripheral devices, such as a mouse or keyboard. The monitor generates an outlet control signal when the peripherals have been inactive for more than a predetermined time.

Preferably the outlet is a standard AC power outlet so any standard video display, or any other peripheral devices using a standard AC power plug, can be turned on-or off by it. Preferably the AC power outlet and the circuitry for turning it on and off are part of the computer's power supply. In some embodiments, the activity monitor monitors multiple devices and can turn off other devices besides the AC outlet in response to different patterns of inactivity. Preferably the AC outlet can be turned off without turning off the computer as a whole, since it is often desirable to let computers perform long task which do not need computer input or a visual display. It is also preferred that the AC power outlet is automatically turned off when the computer is turned off, so the video display or other peripheral device plugged to that outlet do not waste power when the computer is off.

Another aspect of the invention relates to a computer which includes one or more electrically powered fans and an I/O port to which the computing circuit can write to produce different fan speed control signals. A control device varies the fan's speed in response to the different control signals generated by the port. This enables the computer to select a fan speed which is most appropriate and efficient for the system.

Preferably the computer stores a value indicating which fans speed control signal should be generated in a non-volatile memory, so this value can be read and used to generate the appropriate fan speed control signal when the computer is turned on. In a preferred embodiment this value identifies CPU type and is stored in a hard-wired register on the CPU. This enables the cooling fan's speed to be higher for a computer having a hotter CPU than for a similar computer having a cooler CPU.

Preferably the fan-speed-control device includes a device for measuring air temperature and for controlling fan speed as a function of the measured air temperature, as well as the fan speed control signal. In some embodiments two fans are controlled by the fan-speed-control device, and the fans are operated at sufficiently different speeds to prevent any noticeable beating between sounds generated by each.

Preferably both of these aspects of the invention are combined in one computer to provide a combined power savings.

BRIEF DESCRIPTION OF THE DRAWINGS

These and other aspects of the present invention will become more evident upon reading the following description of the preferred embodiment in conjunction with the accompanying drawings, in which:

FIG. 11 is a simplified flow chart representation of the parts of the initialization program which is used when the computer of FIG. 1 is first turned on;

DETAILED DESCRIPTION OF THE INVENTION

Figure 1:
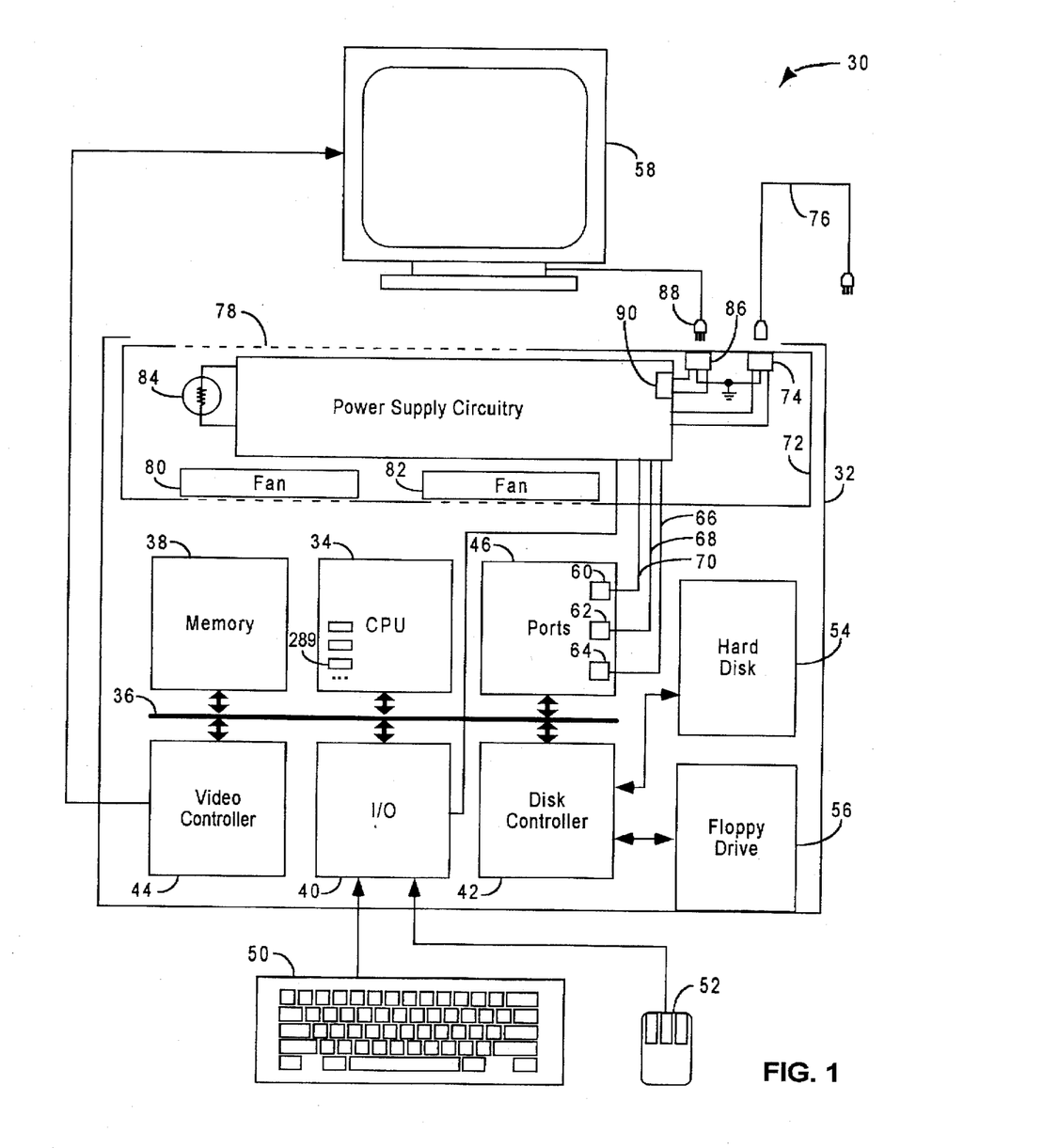
FIG. 1 is a simplified block diagram of a computer system according to a preferred embodiment of the present invention.

Referring now to FIG. 1, a computer system 30 is shown which embodies the power saving features of the present inventions. The computer shown is a desktop computer similar to a SPARCStation workstation computer manufactured by Sun Microsystems, Inc. In other embodiments of the invention other types of computers could be used, including so-called, IBM PC compatible computers.

The computer system 30 includes a box 32 which includes most of the computer's components. These components includes a central processing unit, or CPU, 34, and a bus 36 which lets the CPU communicate with a plurality of other devices also connected to the bus. These other devices include a memory 38, an I/O controller 40, a disk controller 42, a video controller 44, and a port device 46.

As is well known in the computing arts, the CPU reads instructions from memory and executes them. The instructions cause the CPU to read and write information from and to portions of the memory and from and to other devices connected to the bus. The I/O controller 40 receives inputs from a keyboard 50 and a mouse 52 and relays them to the CPU. The I/O ports can also be used to communicate information with other devices, such as a printer, which is not shown. The disk controller 42 reads and writes information between the memory 38 and either a hard drive 54 or a floppy drive 56 under control of the CPU. The video controller 44 generates the video signals which draw computer generated images upon the screen of a video display 58, which in the embodiment shown is a CRT display.

The port device 46 includes a plurality, of control ports 60, 62, and 64, each of which can be separately written to by the CPU, and each of which generates an output signal on a line 66, 68, and 70, respectively, which represents either a 1 or 0 depending on the last value the CPU has written to its associate control port.

The computer also includes a power supply 72 mounted at the rear of the computer. The power supply includes an AC power inlet socket 74 into which an AC power cord can be plugged to connect the power supply to a source of standard AC power. It also includes circuitry 76 which receives the standard AC power from the inlet 74 and converts it into direct current power, at various voltages, for use by the denies of the computer.

The power supply also includes an air inlet 78 at its rear and two fans 80 and 82 for blowing air which pass in through that air inlet out over the CPU and other complex circuitry of the computer. These fans provide cooling to beth the power supply and the rest of the computer. A thermistor 84 is mounted near the air inlet 78 to measure the temperature of the ambient air in which the computer is located. As is explained below in greater detail, the power supply circuitry varies the speed of the fans 80 and 82 in response the ambient air temperature measured by the thermistor 84.

The power supply also includes an AC power outlet 86 into which almost any standard AC power plug can be inserted. This power outlet is mainly intended to receive the plugs of video monitors, such as the plug 88 of the video monitor 58 shown in FIG. 1, although it can be used to power other devices as well. As is explained below, the power supply circuitry includes a switch 90 which can selectively connect or disconnect the AC outlet 90 from the power provided to the AC inlet 74.

The control port 60 and the line 66 it drives are the Outlet Control Port and Outlet Control Line, respectively. When the CPU writes a one to the Outlet Control Port 60, the line 66 is high. When it writes a zero, the line is low. The line 66 is connected to the power supply circuitry and is used to turn off the AC outlet when low, and turn it on when high. An activity monitor program, explained below, turns line 66 on and off in response to whether or not the computer has received recent input on its keyboard or mouse.

The control port 62 and the line 68 are the Fan Control Port and Line, respectively. The line 68 is connected to circuitry 92 in the power supply, shown encircled in a dashed line at the lower right hand corner of FIG. 2, which controls the speed of the fans 80 and 82. The Fan Control Port and line let the CPU control fan speed under program control.

The control port 64 and the line 70 are the Power Off Port and Line, respectively. The Power Off Line 70 is connected to On/Off logic circuitry 94, shown a dashed line in FIG. 2, which turns on and off the power provided by the power supply to the rest of the computer.

Figure 2:
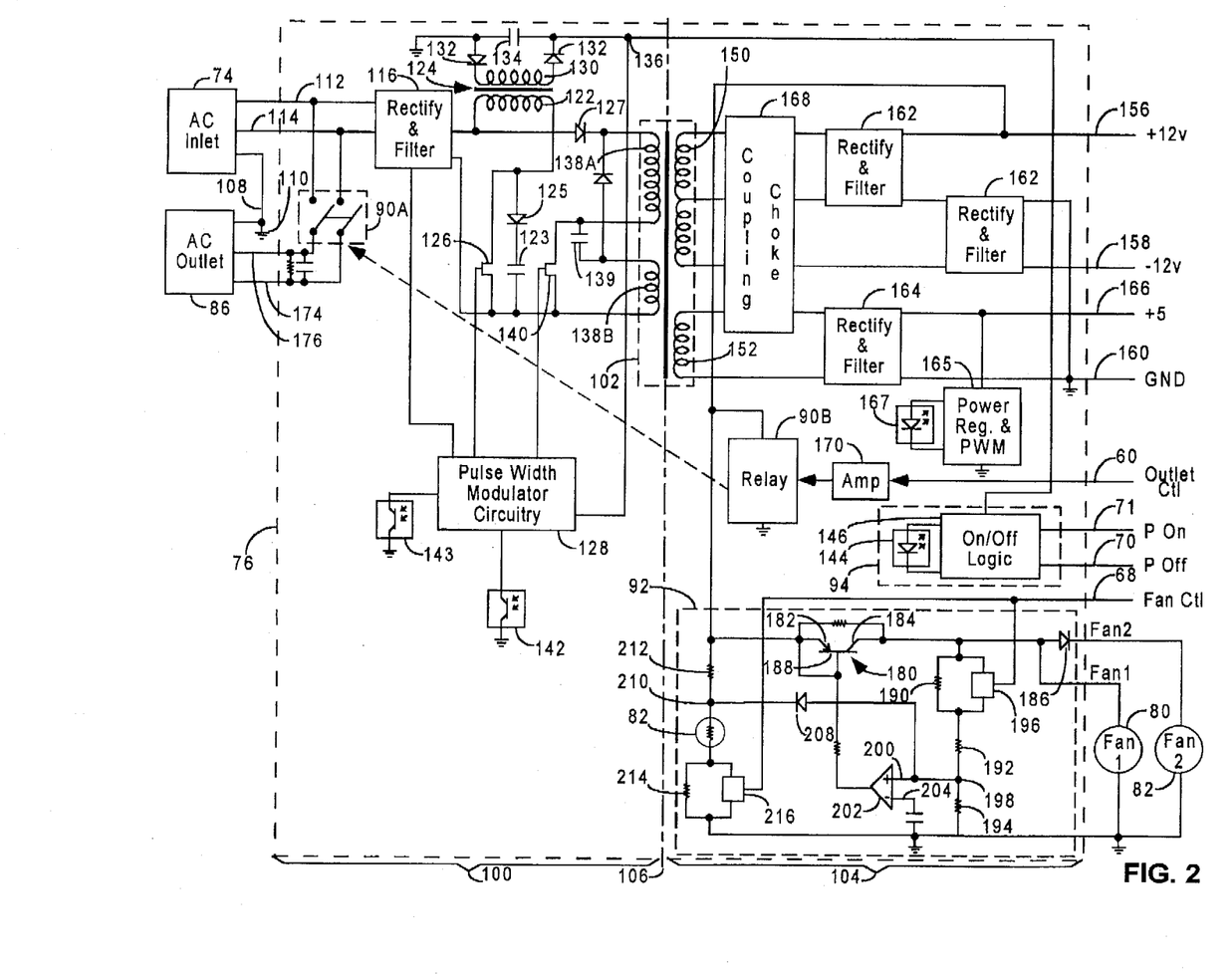
FIG. 2 is a simplified block diagram of the power supply circuit of the computer system of FIG. 1.

A line 71, the Power On line, is connected to the I/0 controller 40 which generates a momentary low signal on that line when the user presses a power on switch on the keyboard 50. This line is also connected to the On/Off logic circuitry 94. It enables the user to turn on the computer from the keyboard 50.

Referring now to FIG. 2, the power supply circuitry 76 will be described in greater detail.

The circuitry 76 is divided into two major parts, a primary side 100, comprised of circuitry on the primary side of the power supply's main transformer 102, and its secondary side 104, comprised of circuitry on the secondary side of that transformer. The division between these two parts of the power supply's circuitry are represented by the dot-dashed vertical line 106.

The AC power inlet 74 is a three prong inlet designed to receive a ground, a load, and a normal input from an AC power plug. The system is designed to handle AC input which varies from ninety to two hundred and sixty-four volts, and which varies from forty-seven to sixty-three hertz in frequency. This enables the system to operate with most of the major AC power standards used in various parts of the world. The ground input, which is supposed to have an electrical potential of approximately zero volts relative to the earth, is connected through a line 108 to the power supply's ground 110. The load and neutral lines each carries a sinusoidal current waveform with voltages which reach positive and negative peaks having approximately the stated voltage of the AC power supplied to the inlet 74. These waveforms are one hundred and eighty degrees out of phi, so, for example, when the voltage of one reaches one hundred and twenty volts, that on the other reaches minus one hundred and twenty volts. The load and neutral inputs are supplied to the inputs of filtration-rectification-capacitance circuitry 116 through lines 112 and 114, respectively.

The circuitry 116 filters voltage spikes from the power received by the AC inlet. It also has a large capacitance, not shown. The load line 112 is connected to one side of this capacitance through a diode of one polarity, and the neutral line 114 is connected to it through a diode having the other polarity, so the capacitance charges up to approximately two hundred and forty volts. The filtration-rectification-capacitance circuitry supplies this rectified voltage of approximately two hundred and forty volts between two output lines 118 and 120.

The primary coil 122 of a low power transformer 124 is connected in series with a switching transistor 126 between the lines 118 and 120. The line 118 also charges up the capacitor 123 through a diode 125. The switching transistor 126 is turned on and off by pulse width modulation circuitry 128, effectively shorting the charge stored on capacitor 123.

Every time the transistor turns on, magnetic lines rise in the primary coil 122 in correspondence with the increase in current flow through it, inducing a current and voltage of the opposite polarity in the secondary coil 130. Every time the transistor turns off, the collapse of the magnetic lines in the primary coil 122 induces a voltage spike in that coil which boosts the voltage on the capacitor 123 up to approximately three hundred and eighty-five volts through diode 125.

The AC current induced in the secondary coil 130 of the low power transformer is rectified by diodes 132 and a capacitance 134 as indicated schematically in FIG. 2. This rectified voltage is supplied via a line 136 to an input of the pulse width modulation circuitry 128. The pulse width modulation circuitry 128 turns the transistor 126 on and off at a fixed frequency, but it varies the duration, or pulse width, of the time transistor 126 is turned on during each cycle to cause the output of the low power transformer 124 provided on line 136 to have the desired voltage.

The pulse width modulation circuitry 128 receives power from the filtration-rectification-capacitance circuitry 116 whenever AC power is supplied to the AC inlet 74. It causes the switching transistor 126 and the low-power transformer to operate whenever it receives power, regardless of whether the main transformer 102 and the computer 30 is turned on or off.

A part of the primary windings 138A of the main transformer 102 is connected in series with the main switching transistor 140 between the approximately three hundred and eight-five volts on capacitor 123. A capacitor 139 and another part of the primary winding 138B of the main transformer are connected in parallel with the transistor 140. The capacitor 139 stores the boost voltage generated by the primary 138A when the main switching transistor is tamed off. The transistor 140 is mined on and off by another part of the pulse width modulation circuitry 128, a part which only switches the transistor 140 when light is supplied to a photodetector 142. When it is being switched, the transistor is turned on and off in correspondence with the receipt of light by a second photodetector 143.

The photodetector 142 is optically coupled to a photodiode 144, which is part of the power supply's On/Off circuitry 94. This photodiode is turned on and off by control logic 146 in response to the Power Off Signal 70 and the Power On Signal 71. A low signal on the Power Off line switches the logic 146 to the Off state, turning off the photodiode 144 and, thus, the operation of the main switching transistor 140. A low signal on the Power On line switches the logic 146 to the On state, turning on the photodiode 144 and, thus, the switching of the main switching transistor 144. The On/Off logic 146 receives power from the rectified output 136 of the low power transformer 124 whenever AC power is supplied to the AC inlet 74, so that it has the power to turn the main transformer 102 on even when the rest of the computer is off.

When the On/Off logic circuit is in an On state, the photodiode 144 provides light to the photodetector 142, and the potion of the pulse width modulation circuit which controls the main transistor causes that transistor to turn on and off so as to generate rising and falling magnetic field lines in the main transformers primary coil windings 138A and 138B, so as to induce alternating currents and voltages in the secondary windings 150 and 152 of the main transformer.

The secondary winding 150 is used to generate plus twelve volt, minus twelve volt, and ground at outputs 156, 158, and 160, respectively. Rectification circuitry L, which has both diodes and capacitors, converts the alternating voltages generated by the winding 150 into rectified plus and minus voltages. In a similar fashion, the secondary winding 152 and rectification circuitry 164 are used to generate plus five volt and ground at output 166 and 160, respectively.

The plus five voltage output 166 provides the majority of the power used by the computer 30. It has a voltage regulation circuit 165 attached to it which drives a second photodiode 167, which is photocoupled to the photodetector 143 that drives the main switching transistor 140. The circuit 165 turns the photodiode 167 on and off at a fixed frequency, but varies the length of time the diode is on each cycle as a function of the voltage at the output 166. When the voltage is below five volts it increases the time the main switching transistor 140 is turned on each cycle to increase the voltage at 166, and when the voltage is above five volts it does the opposite.

A coupling choke 168 inductively couples the circuitry which produces the plus and minus twelve volt outputs 156 and 158 to that which produces the five volt output 166. This is done so the regulation of the five volt output helps to regulate the plus and minus twelve volt outputs.

The plus twelve volts supplied to output 156 is also supplied to power the relay 90B and an amplifying switch 170. The switch 170 receive the Outlet Control signal 66. When this signal is low the switch 170 removes power from the electromagnetic coils of the relay 90B, causing the double-pole switch 90A operated by that relay to break the conductive path between the load and neutral lines 112 and 114 of the AC inlet 74 and the load and neutral lines 174 and 176 of the AC outlet 86, respectively. When the Outlet Control signal is high, the switch 170 supplies power to the electromagnet of the relay 90B, causing the double pole switch to complete the path between the AC inlet 74 and the AC outlet 86, so that AC power will be supplied to that AC outlet.

The Relay 90B only supplies power to the AC outlet when it itself receives power from the plus twelve volt power line. That means that if the On/Off logic 146 turns off the main transformer 102 in response to a low signal on the Power Off line 70, the power to the AC outlet will also be mined off, regardless of the state of the Outlet Control Signal.

The fan control circuitry 92 controls the power supply's two cooling fans 80 and 82 by varying the voltage supplied to each as a function of the temperature sensed by the thermistor 84 and as of function of whether or not the Fan Control line 68 is high or low.

Figure 3:
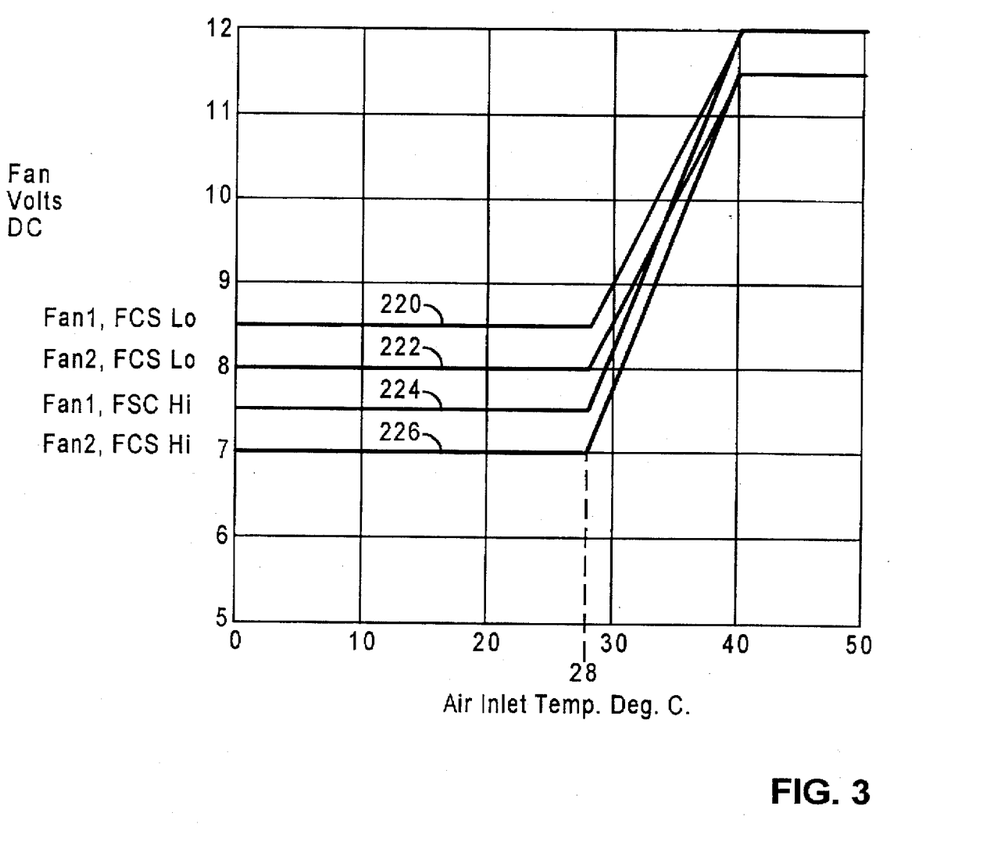
FIG. 3 is a diagram of the approximate air temperature/fan voltage function used to control fan speed in the embodiment of the invention shown in FIG. 1.

FIG. 3 illustrate the approximate voltages which this circuitry supplies to fans 80 and 82 (fan 1 and fan 2, respectively,. in FIG. 3). This voltage is supplied as a function of temperature and the Fan Control signal (FCS). The curves 220 and 222 indicate the higher voltages supplied to fans 1 and 2, respectively, when the Fan Control signal is low. The curves 224 and 226 indicate the lower voltages supplied to fans 1 and 2, respectively, when that signal is high.

As shown in FIG. 3, the voltages 222 and 226 supplied to fan 2 am always approximately one half volt lower the voltages 220 and 224 supplied to fan 1. This is done so that the speed of the two fans will always be different enough so that the sounds of their vibrations will not produce an annoying rising and falling audible interference pattern known as beating.

The fan control circuitry 92 of FIG. 2 includes a PNP fan voltage transistor 180. The transistor's emitter 182 is connected to the power supply's plus twelve volt power output 156. The transistor's collector 184 is connected to fans 1 and 2. It is connected to fan 1 directly. It is connected to fan 2 through a voltage drop diode 186 which causes the voltage supplied to fan 2 to always be approximately one-half volts less than that supplied to fan 1, so as to prevent the beating mentioned in the preceding paragraph. The lower the voltage supplied to the transistor's base 188, the more the transistor 180 will be turned on, and the closer the voltage supplied to its collector 184 will be to the twelve volts supplied to its emitter 182.

The collector 184 of the fan voltage transistor is also connected to a voltage divider which includes the following elements connected in series between it and ground: a resistor 190 connected in parallel with a transistorized switch 196, a resistor 192, a voltage tap 198, and a resistor 194. This voltage divider is called the low temperature voltage divider because it determines the substantially constant voltages which are supplied to the fans below twenty-eight degrees centigrade, as shown in FIG. 3.

The transistorized switch 196 of FIG. 2 is connected to and is controlled by the Fan Control line 68. When this line is low, the switch is virtually non-conductive, and the voltage divider operates as if it contained only the resistors 190, 192, and 194 in series. When the fan control line is high, the switch 196 becomes conductive, shorting resister 190 out of the voltage divider and making it as if the divider included only the resisters 192 and 194.

The voltage tap 198 is connected to the positive input 200 of an amplifier 202. The other input 204 of the amplifier 202 is connected to a voltage reference 206 which supplies a fixed 1.5 volts. The output of the amplifier 202 is supplied to the base 188 of the fan voltage transistor 180.

The positive input 200 to the amplifier 202 is also connected through a diode 208 to a voltage tap 210 in a second voltage divider comprised of the following elements connected in series between positive twelve volts and ground: a resistor 212, the voltage tap 210, the thermistor 84, and a resistor 214 and a transistorized switch 216 connected in parallel. This voltage divider is called the high temperature voltage divider because it controls fan voltages at temperatures above twenty-eight degrees centigrade.

The parallel combination of resistor 214 and switch 216 acts similarly to the parallel combination of resistor 190 and switch 196 described above. That is, when the fan control signal is low, the switch 216 is open and the high temperature voltage divider is comprised of the resistances of resistor 212, thermistor 82, and resistor 214 in series. When the fan control signal is high, the switch is on and the voltage divider is comprised of only the resistances of resistor 212 and thermistor 82.

The polarity of the diode 208 is such that the lower of the two voltages at the high temperature voltage tap 210 and the low temperature voltage tap 198 is supplied to the input 200 of the amplifier 202.

Below twenty-eight degrees centigrade, the voltage at the low temperature voltage tap 198 will be lower than that at the high temperature voltage tap 210. This voltage at tap 198 will cause the amplifier 202 to turn on the fan voltage transistor to the extent that the voltage at its collector equals approximately seven and a half, or eight and a half, volts, depending upon whether the Fan Control signal is high or low, respectively. These are the voltage supplied to fan 1 in this temperature range, as shown in FIG. 3.

As the temperature of air around the thermistor 82 rises, the thermistors resistance decreases, causing the voltage at the high temperature voltage tap 210 to also drop. At temperatures of approximately twenty-eight degrees centigrade and above, the voltage at this tap will be lower than that of the low temperature voltage tap 198, causing the high temperature voltage divider to control fan speed. As indicated in FIG. 3, above approximately twenty-eight degrees centigrade the voltage supplied to the fans increases approximately linearly with temperature, as the resistance of the thermistor continues to drop, further decreasing the voltage supplied by the voltage tap 210 to the amplifier 202, and, thus, by the amplifier to the base of the fan voltage transistor 180.

At approximately forty degrees centigrade the transistor 180 will be turned substantially all the way on, causing the voltage at the transistor's collector to substantially equal the twelve volts supplied to its emitter. Once this has happened, the fan voltage cannot increase any further and the voltage curves flatten out, as is shown in FIG. 3.

The fan curves 220 and 222 shown in FIG. 3 have higher voltages than the curves 224 and 226 because when the Fan Control signal is low, switches 196 and 216 will be open, and the resistance of resistors 190 and 214 are added to the low and high temperature voltage dividers, respectively. The addition of the resistance 190 above the voltage tap 198 in the low temperature voltage divider decreases the voltage at that tap, turning the transistor 180 on further, and, thus, increasing the fan voltage. This difference is shown in the portions of the fan curves 220 and 222 which are below approximately twenty-eight degrees in FIG. 3.

Adding the resistance 214 between the thermistor 82 and ground decrease the percent of the high temperature voltage divider's total resistance comprised by the thermistor. This decreases the rate at which the voltage at tap 210 drops as a function of decreases in the thermistor's resistance caused by increases in air temperature. This decreases the slope of the voltage vs. temperature curves 220 and 222 relative to those of curves 224 and 226 in the range between approximately twenty-eight and forty degrees centigrade, so the curves 220 and 222 don't reach their maximum fan speed before forty degrees centigrade, the top operating temperature intended for the computer 30.

Figure 4:
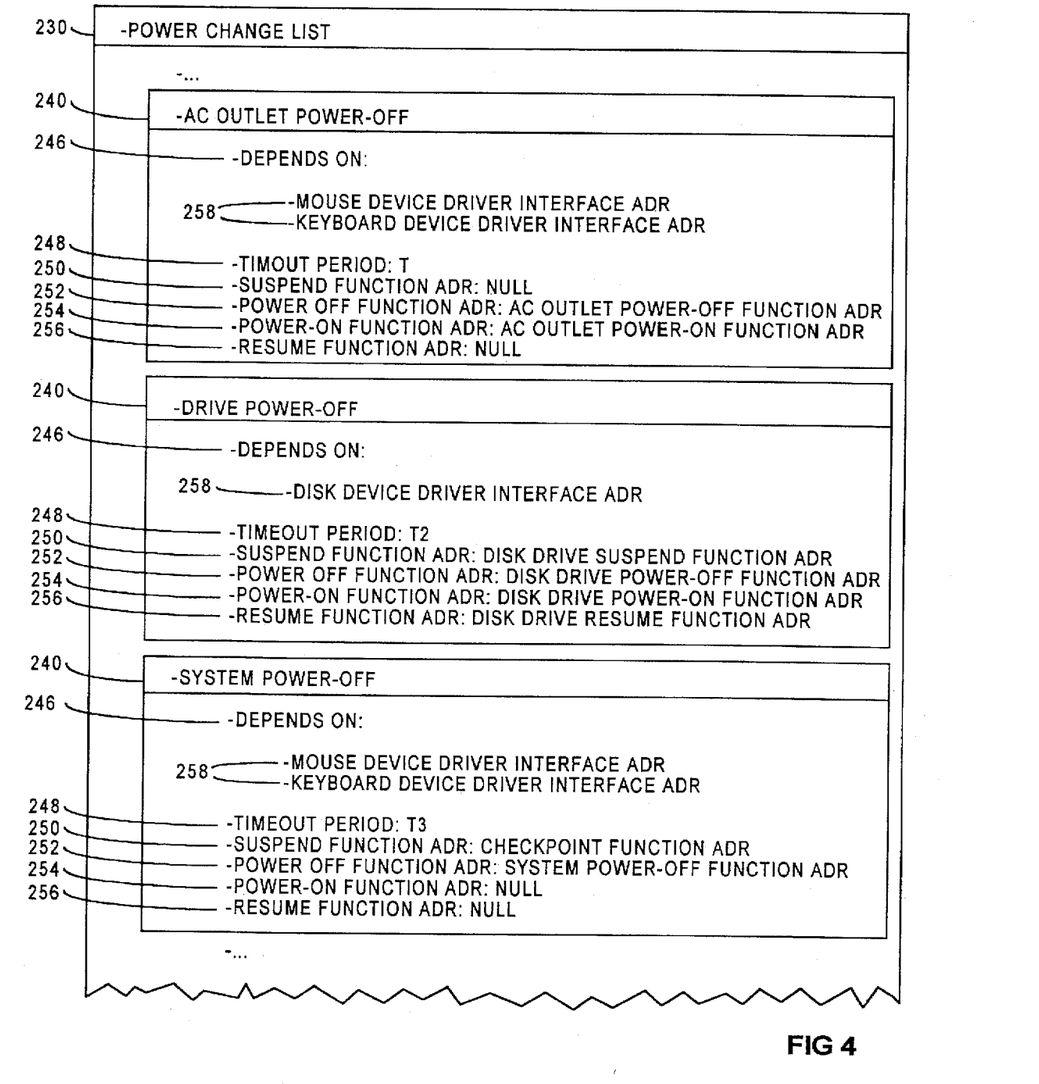
FIG. 4 is simplified representation of a data structure used by the activity monitor of the computer of FIG. 1 to determine which devices should have power shut off in response to which patterns of inactivity.
Figure 5:
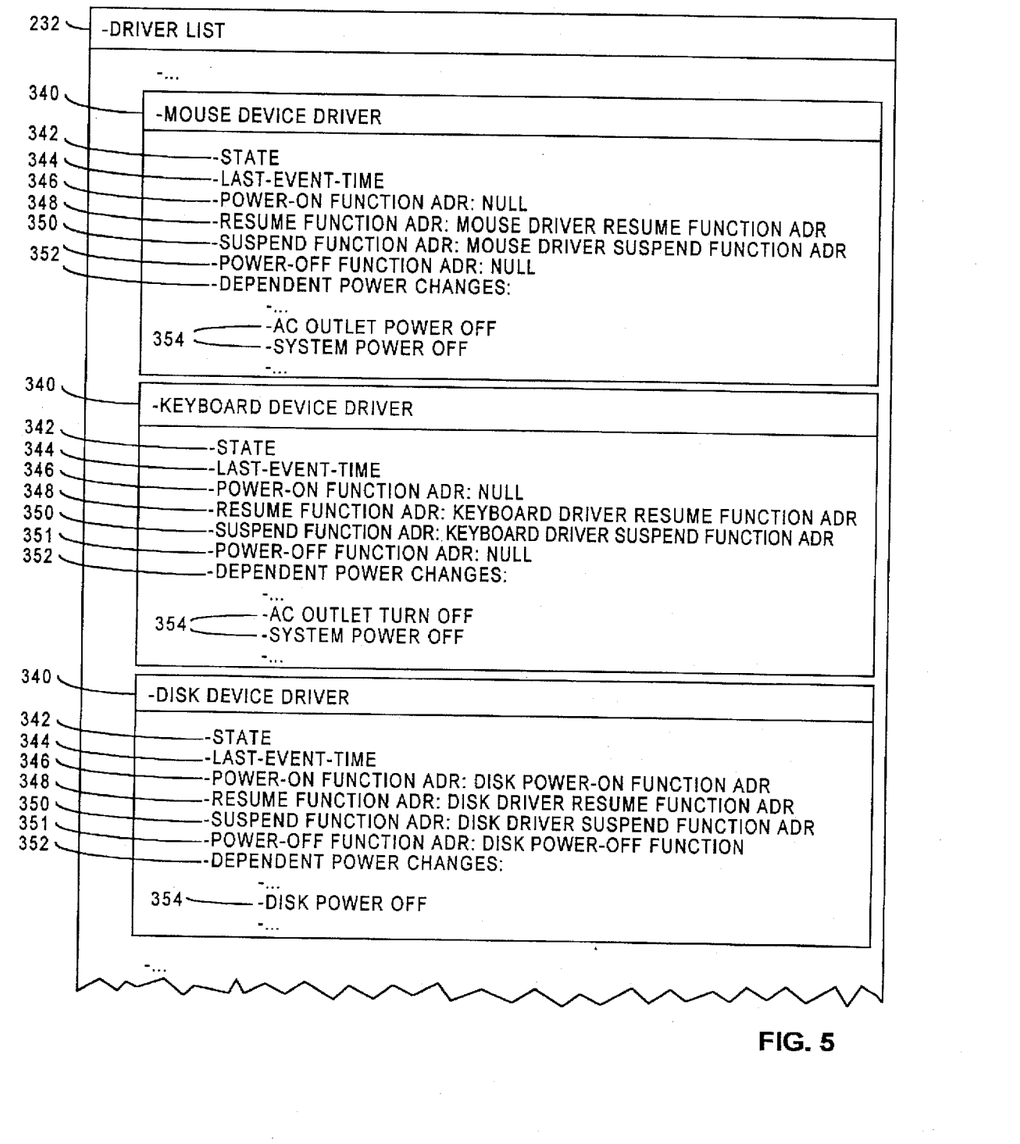
FIG. 5 is a simplified representation of a data structure used in the computer of FIG. 1 to determine which devices should be mined on when certain activity occurs.
Figure 6:
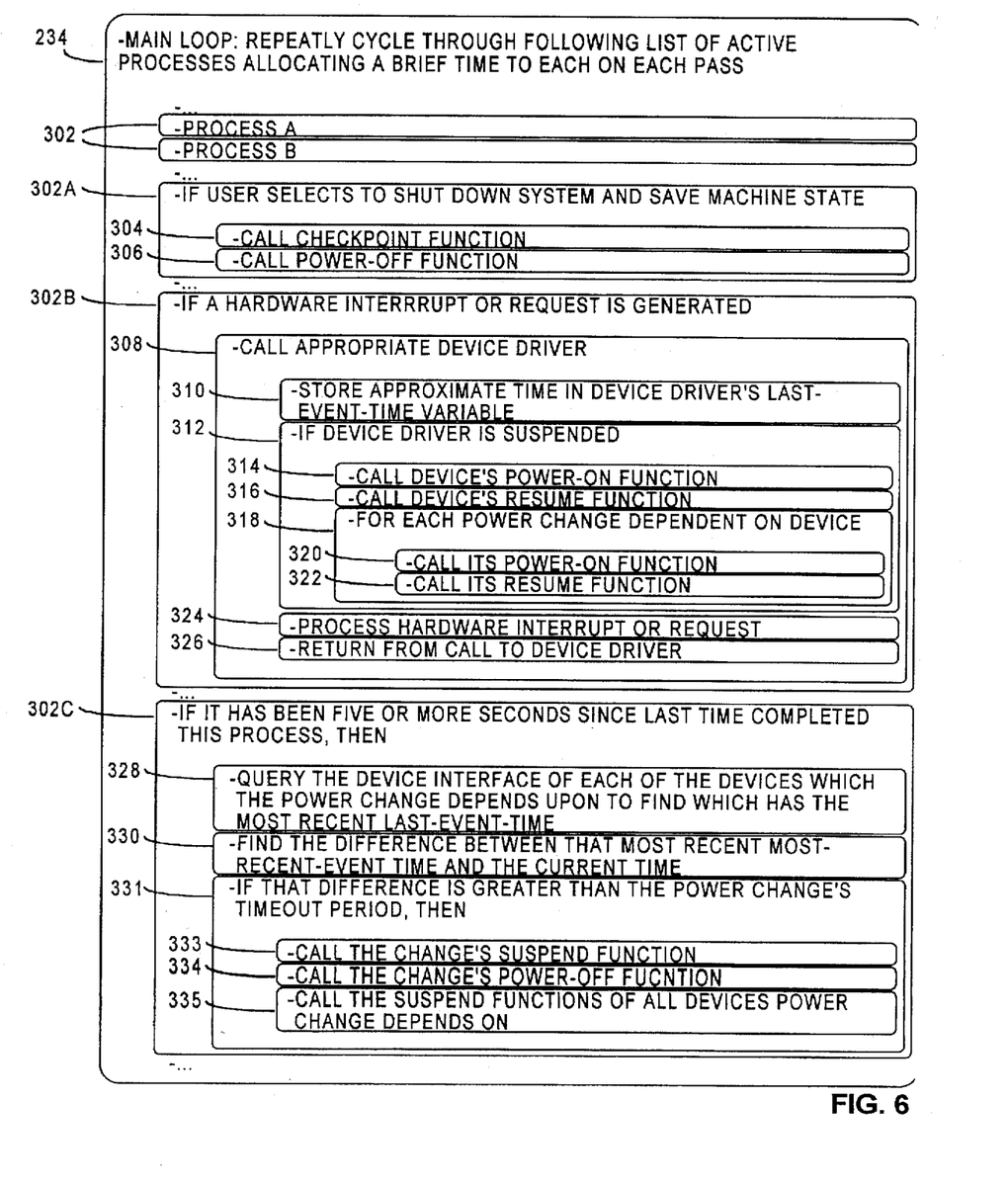
FIG. 6 is a simplified flow chart representation of the main loop of the operating system used in the computer of FIG. 1, illustrating processes of the activity monitor which turn devises on and off in response to activity or inactivity, respectively.

FIGS. 4–12 are highly simplified illustrations of programming and data structures which comprise the activity monitor function and other power saving aspects of the invention. FIG. 4 illustrates the Power Change List 230 which stores information the activity monitor uses to know when and how to turn of power to parts of the computer. FIG. 5 illustrates the Driver List 232, which, among other things, stores information necessary to know which devices to turn back on when certain activity is detected. FIG. 6 illustrate the main control loop 234 of the computer's operating system, including a process that can shut down the computer, and processes the activity monitor uses to turn on and off devices, including the AC outlet 86, in response to activity or inactivity of certain devices. FIGS. 7–12 are brief descriptions of some of the functions called as a result of the processes shown in FIG. 6 or by the computer's initialization routine.

The Power Change List 230, shown in FIG. 4, has a record 240 for each of a plurality of power changes, such as the AC Outlet Power-Off change, the Drive Power-Off change, and the System Power Off change shown. Each such record contains fields 246, 248, 250, 252, 254, and 256. The field 246 contains a list of the devices 258 upon the inactivity of which the power change depends. The field 248 stores the length of time which all the devices listed in field 246 must have been inactive before the change will be made. The field 250 includes the address of the function, if any, which is called to prepare the software associated with the device, such as its device drivers, for the power change. The field 252 includes the address of the function which is called to actually cause the change in power consumption. This usually involves actually cutting power to certain hardware components. The field 254 stores the address of the function to undo the power saving change. Finally field 256 stores the address of the function, if any, which prepares the software associated with the device for the return to greater power accomplished by the function stored in field 254.

FIG. 4 shows only three of the many possible power change records which can be stored in the Power Change List. The first record 240 shown in FIG. 4 contains the information used to turn on and off the AC power outlet 86. Its field 246 indicates that the AC power outlet is to be turned off when the mouse and keyboard have been inactive for the specified period. Its field 248 indicates that the specified period is the time T. Fields 250 and 256 indicate that there are no changes to software or drivers which are associated with this change. This is as one would expect, since the computer does not know what if any device is plugged into the AC outlet and thus has no way of knowing what associated device drivers should be altered.

Figure 7:
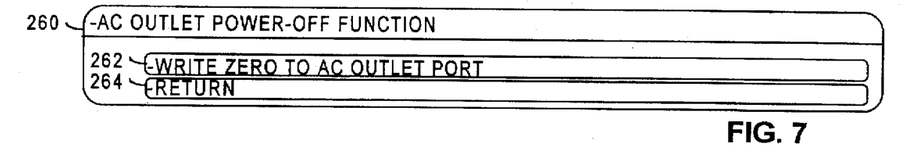
FIG. 7 is a simplified flow chart representation of a software function that turns off the AC power outlet in the computer of FIG. 1.

The field 252 has the address of the AC Outlet Power-Off function, the function which actually turns off the AC outlet 86. As is shown in FIG. 7, this function 260 comprises an instruction 262 which writes a zero to the AC outlet port 60, shown in FIG. I. This causes the Outlet Control line 66 to be low, causing the amplifying switch 170, shown in FIG. 2 to man off the relay 90B, disconnecting the AC outlet 86 from the AC inlet 74. Once this is done, instruction 264 causes the program flow to return to whatever routine called the function 260.

Figure 8:
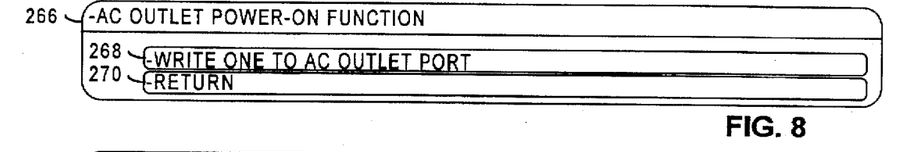
FIG. 8 is a simplified flow chart representation of a software function that turns on the AC power outlet in the computer of FIG. 1.

The field 254 has the address of the AC Outlet Power-On function, which turns the AC outlet 86 on. As is shown in FIG. 8, this function 266 comprises an instruction 268 which writes a one to the AC outlet port 60, which causes the relay 90B to be turned on, reconnecting the AC outlet 86 to the AC inlet 74. The instruction 270 then returns the program flow to whatever process called the AC Outlet Power-On function 266.

The second record 240 shown in FIG. 4 stores information for the Drive Power-Off changes. This is the function that turns off a disk drive when it has been inactive for a prolonged period. As can be seen from its fields 246 and 248, this change only occurs when the disk drive itself has been inactive for a period of over T2. Since the disk drive has software drivers associated with it, the fields 250 and 256 include the address of functions for suspending and resuming those drivers. Dryer suspend and resume functions change the value of their associated driver State variable 342, shown in FIG. 5, so that the driver knows the operational status of its associated device.

The third record 240 shown in FIG. 5 stores information for the System Power-Off change. Its fields 246 and 248 indicate that this change occurs when there has been no activity on the keyboard or mouse for over a period T3. The third record's field 250 indicates that its software suspend function is the Checkpoint Function.

Figure 9:
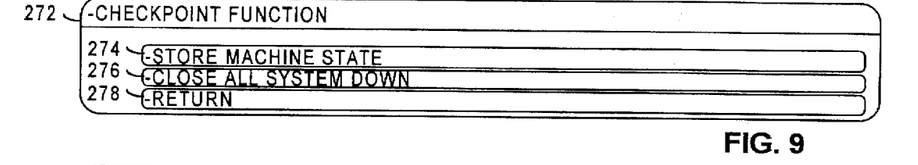
FIG. 9 is a simplified flow chart representation of a software function used by the computer of FIG. 1 to save the system state and shut down software prior to tug off power.

This Checkpoint function 272 is shown in FIG. 9. It includes a step 274 which stores the computers machine state, including all important information stored in the CPU 36, the memory 38, and other devices, which is necessary to enable the computer to be returned to its current state afar it has been turned off and then restarted. This information is then stored in one or more special files on the computer's hard disk. Then in step 276 the Checkpoint function substantially shuts the system's software down, and its step 278 returns to the process which called the function.

Figure 10:
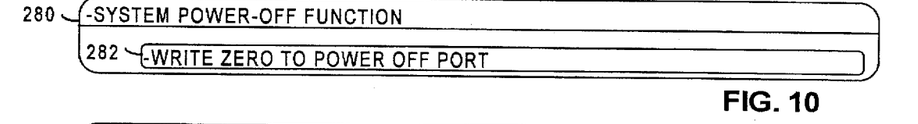
FIG. 10 is a simplified flow chart representation of a software function used by the computer of FIG. 1 to turn substantially the entire computer off.

The field 252 of the System Power-Off record stores the address of the System Power-Off function 280, shown in FIG. 10. It contains a step 282 which writes a zero to the power off port 64, causing the Power Off line 70 to be low. This causes the On/Off Logic 146 to turn off the photodiode 144, which, in turn, causes the switching transistor 140 to stop switching. This removes power from the main transformer 102, turning off everything in the computer except for the On/Off Logic 146 and circuitry on the primary side of the power supply.

The fields 254 and 256 of the System Power-Off record can contain null values, because the system is not turned on by software. Instead the system is turned on by hardware, such as by the pressing of the keyboard key which generates the low signal on the Power On line 71, described above. This causes the system's On/Off logic 146, which is always on if the computer is plugged in, to turn on the photodiode 144, causing the main switching transistor 140 to power the main transformer, and, thus, causing the power supply to be fully turned on. When the power supply turns on, power is provided to the computer's CPU, memory, and other circuitry, and the CPU starts to execute an initialization routine. The described embodiment executes the Initialization Routine 284 illustrated in FIG. 11.

Figure 11:
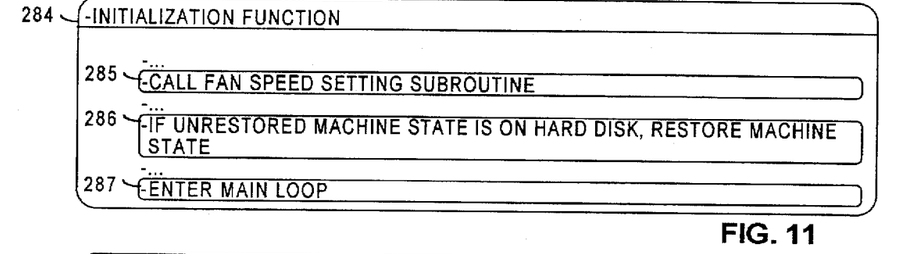
Figure 12:
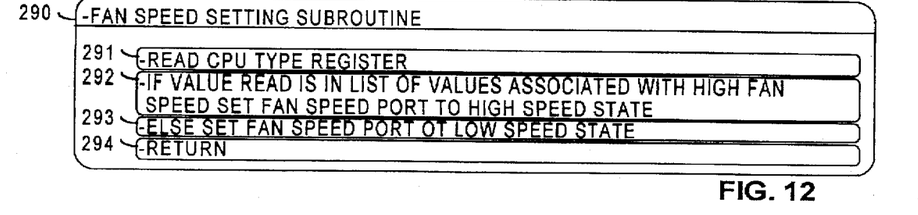
FIG. 12 is a simplified flow chart representing a software function that sets the fan speed control signal in the computer of FIG. 1.

The Initialization Routine 248 includes many steps, only several of which are shown in FIG. 11. Among other steps, it includes a step 285 which calls the Fan Speed Setting Subroutine 290, shown in more detail in FIG. 12. This Fan Speed Setting Subroutine includes steps 291, 292, 293, and 294. Step 291 reads the value of a hard wired CPU register 289 which stores a ID value identifying the type of the CPU. Then step 292 compares the ID value just read with a list of ID values stored in a read only portion of the computer's memory. This list contains the IDs of CPUs which are known to generate a relatively large mount of heat. If the ID value read from the computers CPU is one of those on the list of relatively hot CPUs, step 292 writes a zero to the Fan Control port 62. This causes the Fan Control signal 68 to have a low value, which causes the fans to operate according to the higher voltage curves 220 and 222. If the ID value read is not one of those on the list, step 292 writes a one to the Fan Control port 62, which causes the Fan Control signal to be high and the fans to operate according to the lower voltage curves 224 and 226. Once this is done the Fan Speed Setting Subroutine returns to the Initialization Routine of FIG. 11.

Another step of the Initialization Routine is the step 286 which tests to see if there is an un-restored machine state file on the computers hard disk. If so, the step restores that machine state by reading the information from that file back into the CPU and memory of the computer.

Once this and the rest of the Initialization Routine have been completed, the routine's last step 287 is a jump to the operating system's main loop 234, described below with regard to FIG. 6.

The Driver List 232 of FIG. 5, stores a record 340 for each device driver, only a few of which are shown in that figure. Each such record includes fields 342, 344, 346, 348, 350, and 352. Field 342 stores the State of the driver, that is, whether or not it is currently in the suspended or resumed state. Field 344 stores the Last-Event-Time for the driver, indicating the last time the driver was active.

Field 346 stores the address of the driver's Power-On function. Such a function will only exist if the driver's associated hardware device can be turned on or off by software. Field 348 stores the address of the driver's resume function. This function prepares the driver to resume normal operation after being suspended. At the least, it changes the state of the driver's State variable 342 to the Resumed state. Field 350 includes the address of the driver's suspend function, which prepares the driver to enter a suspended state. At the least, it causes the driver's State variable to be changed to a Suspended value. The field 352 stores the address of the power-off function of the driver's associated hardware device, if it is a device that can be turned on and off by software.

Finally the field 352 stores a list of all the power changes which are dependent upon the inactivity of the driver's devices. This information is stored so that if the device receives activity the system will know which power saving changes need to be reversed.

The scheduler of the computer's operating system is represented schematically by the main loop 234 shown in FIG. 6. This scheduler repeatedly cycles through a list of active software processes, allocating a small fraction of a second to execute the instructions of each during each cycle. The list can include a plurality of processes 302, such as those involved with user programs or the operating system itself.

If the user selects to shut down the system and save the machine, such as by selecting an item on a user interface menu, a process 302A cause steps 304 and 306 to be performed. Step 304 will call the Checkpoint Function 272 shown in FIG. 9, saving the computer's machine state and shutting its software down, and step 306 will call the System Power-Off Function 280, which actually turns off the computer's power supply.

If the user provides input to a hardware device, such as a mouse or keyboard, a hardware interrupt or request will be generated by that device. This will cause a process 302B to be placed on the list of processes to be performed. This process has a step 308 which will call the appropriate device driver. This device driver will respond by performing steps 310 and 312 among others. These steps are shown in place in FIG. 6 for purposes of simplicity). Step 310 will store the approximate current time in the Last-Event-Time field 344 in the record 340 (shown in FIG. 5) associated with the device driver. This enables the driver to remember how long it has been since its last activity.

Then step 312 tests the value of the State field 342 in the driver's record 340 to see if the driver is currently suspended.

If so, step 314 calls the driver's Power-On function pointed to by its Field 346 to turn on the driver's associated hardware, if it is a hardware device which can be turned on or off by software. Then step 316 calls the driver's resume function pointed to by its field 348, to change the state of the driver's State variable and to perform any other steps necessary to prepare it for normal operation. Then step 318 goes through each of the Power Changes 350 stored in the Driver's Dependent Power Changes list 352. For each such change a step 320 and a step 322 are performed. The step 320 calls the power-on function listed in the field 254 of that change's record in the Power Change List. Then step 322 calls the resume function listed in the field 256 for that function.

If step 312 finds the driver is not in the suspended state, as is usually the case during normal use of the computer, the steps 314, 316, and 318 will not be performed, saving time.

Whether or not the test of step 312 is met, the driver ultimately performs a step 324 in which it processes the hardware interrupt or request, and then it performs a step 326 in which it returns from the device driver.

The process 302B, just described, includes the part of the computer's activity monitor which turns devices on in response to activity. The process 302C is the part of the activity monitor which turns devices off in response to inactivity. The scheduler of the operating system only performs the steps of the process 302C once every five seconds to save time. This process contains a loop 328 which performs the steps 330–335 for each of the power changes in the Power Change List 232.

Step 330 finds the most recent Last-Event-Time 344 for all of the device driven listed in the Depends On field 246 (shown in FIG. 4) of a given power change. Then step 331 finds the difference between that most recent Last-Event-Time and the current time. Step 332 tests to see if that difference is greater than the Timeout Period stored in the power change's field 248. If it is, steps 333, 334, and 335 perform the power saving change. Steps 333 and 334 call the change's suspend and power-off functions, respectively, indicated in its fields 250 and 252. Then step 335 calls the suspend functions of all the devices in the power change's Depends On field 246. This insures that once a power saving change has been made, the next time them is any activity which generates a hardware interrupt or request on any devices upon which that power saving change depends, the test in step 312 will be met, causing the power saving change to be undone.

The combination of the processes 302B and 302C form an activity monitor which can turn on and off controlled devices depending on the inactivity of monitored devices. The process 302B turns off power to such controlled devices, including the AC outlet 86 and the computer's main power transformer, when their associated monitored devices, such as the keyboard and mouse, have been inactive for more than specified periods of time. The process 302B turns power on to controlled devices, such as the AC outlet, which have been shut off, when their associated monitored devices are used.

This means that hardware and software described above allows any normal device which is plugged into the AC power outlet 86 to be turned on and off by the system's activity monitor, as part of a comprehensive system for saving power in response to various durations and type of inactivity.

Preferably the computer's soft-ware allows the user to edit the Power Change List, so that the type and duration of inactivity required to turn off the AC power outlet and the other devices controlled by the activity monitor can be changed.

It should be understood that the forgoing descriptions and drawings are given merely to explain and illustrate the invention and that the invention is not to be limited thereto, except in so far as the interpretation of the appended claims are so limited. Those skilled in the art who have the disclosure before them will be able to make modifications and variations therein without departing from the scope of the invention.

It should be understood that in other embodiments of the invention to computer used could be other than a desktop computer. It should also but understood that the power supplied by the controllable power outlet could be other than standard AC power of the type normally supplied by wall sockets. For example, in some embodiment, the computer could be a laptop computer and the power provided at its controlled power outlet might have a relatively low DC voltage of the type used to power many electric and electronic devices.

It should be understood, for example, that in other embodiments multiple controlled AC sockets can be provided and the durations and types of reactivity required to shut of each can be different.

It should also be understood that it is preferred that the user be enabled to easily turn on and off the activity monitors ability to disconnected and reconnect the AC outlet, or its ability to power down the system. For example, one might be using a computer to generate a continuous self-running visual presentation in a retail store or at a trade shown. In this case he or she would not want the activity monitor to turn off the AC outlet into which the computers visual display has been plugged, even if there is no activity on the keyboard. In other situations, such as when the user is running a very long computation, he or she might be willing to let the AC outlet shut off the monitor when there is no user input, but he or she would not want the computer to power down because of such inactivity.

Those skilled in programming will understand that the activity monitor and fan control software described above could be designed very differently than that described above. For example, an activity monitor capable of mining on and off the AC outlet and/or other devices could be programmed without using the Power Change List and the Driver List described above.

Similarly, those skilled in hardware design will understand that the invention is not limited to the hardware described above with regard to FIGS. 1 and 2. For example, the invention could be used with many different types of power supplies, besides the switching power factor corrected power supply described above. It could be used with non-switching power supplies.

It should be obvious that the present invention could be used with a device which enables the computer to generate multi-value fan control signals, rather than just one with high or low values, as described above, and that the computer could generate those signals in response to something other than a value representing CPU type. For example, it could generate a fan control signal as a function of the type and number of boards plugged into its motherboard.

Accordingly, the invention is not to be limited to the specific embodiments illustrated and described, and the true scope and spirit of the invention are to be determined by reference to the following claims.

What we claim is:

1. A method to improve the cooling of a computer system, comprising the steps of:

providing an electrically powered fan;

providing computing circuitry which can execute stored instruction programs and which can generate a fan speed control signal under program control, which signal can have one of at least two possible values;

providing a fan-speed-control device for controlling the speed of the fan in response to the fan speed control signal;

wherein the step of providing a fan-speed-control device includes:

providing a device for measuring the temperature of adjacent air;

providing a device for generating a speed-temperature function the value of which varies as a function of the measured air temperature for a given value of the fan speed control signal and for driving the speed of said fan in accordance with the value of said speed-temperature function; and providing a device for varying the speed-temperature function in response to the value of the fan speed control signal so the values of the speed-temperature function generated for a set of measured air temperatures vary as a function of the value of the fan speed control signal.

2. A method as in claim 1 wherein the step of providing computing circuitry includes providing circuitry for storing a value indicating which fan speed control signal should be generated, and for storing instructions for reading that value and for responding to it once read by generating the fan speed control signal indicated by the value read.

3. A method as in claim 1 wherein:

the step of providing computing circuitry includes providing a central processing circuit which has a plurality of memory registers, at least one of which is a non-volatile register; and the value indicating which fan speed control signal should be generated is stored in the non-volatile register.

4. A method as in claim 1 wherein the step of providing a fan includes providing two fans controlled by the fan-speed-control device.

5. A method as in claim 4 wherein the step of providing a fan-speed-control device, includes providing such a device which controls the speed of each fan in response to the fan speed control signal, but causes each fan to operate at a sufficiently different speed to substantially prevent audible beating between the two fans.

6. A method as in claim 1 wherein:

said device for generating a speed-temperature function generates a function which continuously varies over a range of temperatures as a function of temperature for a given value of the fan speed control signal; and said fan speed control device causes the speed of the fan to vary continuously with changes in temperature over a range of temperatures in response to said variations in the speed-temperature function generated for a given value of the fan speed control signal.

7. A computer comprising:

an electrically powered fan;

computing circuitry which can execute stored instruction programs and which can generate a fan speed control signal under program control, which signal can have one of at least two possible values;

an I/O port to which the computing circuit can selectively write to cause the port to generate one of at least two different fan speed control signals;

a fan-speed-control device for controlling the speed of the fan in response to the fan speed control signal;

wherein the fan-speed-control device includes:

a device for measuring the temperature of adjacent air;

a device for generating a speed-temperature function the value of which varies as a function of the measured air temperature for a given value of the fan speed control signal and for driving the speed of said fan in accordance with the value of said speed-temperature function; and a device for varying the speed-temperature function in response to the value of the fan speed control signal so the values of the speed-temperature function generated for a set of measured air temperatures vary as a function of the value of the fan speed control signal.

8. A computer as in claim 7 wherein the computing circuitry includes circuitry for storing a value indicating which fan speed control signal should be generated, and for storing instructions for reading that value and for responding to it once read by generating the fan speed control signal indicated by the value read.

9. A computer as in claim 8 wherein:

the computing circuitry includes a central processing circuit which has a plurality of memory registers, at least one of which is a non-volatile register; and the value indicating which fan speed control signal should be generated is stored in the non-volatile register.

10. A computer as in claim 7 wherein two fans are controlled by the fan-speed-control device.

11. A computer as in claim 10 wherein the fan-speed-control device controls the speed of each fan in response to the fin speed control signal, but causes each fin to operate at a sufficiently different speed to substantially prevent audible beating between the two fans.

12. A computer as in claim 7 wherein:

said device for generating a speed-temperature function generates a function which continuously varies over a range of temperatures as a function of temperature for a given value of the fan speed control signal; and said fan speed control device causes the speed of the fan to vary continuously with changes in temperature over a range of temperatures in response to said variations in the speed-temperature function generated for a given value of the fan speed control signal.

13. A computer comprising:

an electrically powered fan;

a device for measuring the temperature of adjacent air;

a device for detecting which of different possible hardware configurations is in said computer;

a device for generating a signal to drive the speed of said fan which causes the speed of said fan to vary both as a function of said measured temperature and said hardware configuration detected.

14. A computer as in claim 13 wherein said device for detecting reads a hardwired register on a CPU to determine which type of CPU is in use in said computer.

15. A computer as in claim 13 wherein said device for generating a signal to drive said fan causes the speed of the fan to vary continuously with changes in temperature over a range of temperatures.

* * * * *

UNITED STATES PATENT AND TRADEMARK OFFICE
CERTIFICATE OF CORRECTION

PATENT NO. : 5,687,079
DATED : November 11, 1997
INVENTOR(S) : Robert M. Bauer and Thomas P. Webber It is certified that error appears in the above-identified patent and that said Letters Patent is hereby corrected as shown below:

In Column 14, Line 56, the end of the line ending "at least two possible values;" please insert --and--.

In Column 15, Line 17, change the parent claim of Claim 3 from "Claim 1" to --Claim 2--.

In Column 15, Line 51, at the end of the line ending "fan speed control signals;" please insert --and--.

In Column 16, Line 27, change each of the two occurrences of the word "fin" to --fan--.

In Column 16, Line 44, at the end of the line ending "is in said computer;" please insert --and--.

Signed and Sealed this

Seventh Day of July, 1998

Attest:

BRUCE LEHMAN

Attesting Officer

Commissioner of Patents and Trademarks